Mar. 20, 1923.

K. WEKERLE

LOCK FOR MOTOR VEHICLES

Filed Oct. 18, 1920

1,448,983

INVENTOR.
Karl Wekerle
BY
ATTORNEYS.

Patented Mar. 20, 1923.

1,448,983

UNITED STATES PATENT OFFICE.

KARL WEKERLE, OF WEST HOBOKEN, NEW JERSEY.

LOCK FOR MOTOR VEHICLES.

Application filed October 18, 1920. Serial No. 417,569.

*To all whom it may concern:*

Be it known that I, KARL WEKERLE, residing in West Hoboken, in the county of Union and State of New Jersey, have invented certain new and useful Improvements in a Lock for Motor Vehicles, of which the following is a specification.

This invention relates to improvements in locks for motor vehicles, and one of the objects of the invention is to provide a new and improved lock of the above character, which is simple in construction, can be easily operated from the dash of the car, and which when operated places the operative mechanism in such condition that it cannot be operated to propel the vehicle.

Another object of the invention is to provide a construction, such that means is provided for locking said operative mechanism at a plurality of places, any one of said means being sufficient to prevent the operation of the vehicle.

A further and more specific object of the invention is to provide means for locking the transmission mechanism when the shift lever is in the "reverse" position, combining said last mentioned locking mechanism with other locking mechanism, the construction being such that in the event of the failure of the other locking mechanism to operate, the vehicle could only be propelled in a reverse direction.

Other objects and aims of the invention, more or less specific than those referred to above, will be in part obvious and in part pointed out in the course of the following description of the elements, combinations, arrangements of parts and application of principles, constituting the invention; and the scope of protection contemplated will be indicated in the appended claims.

Figure 1:
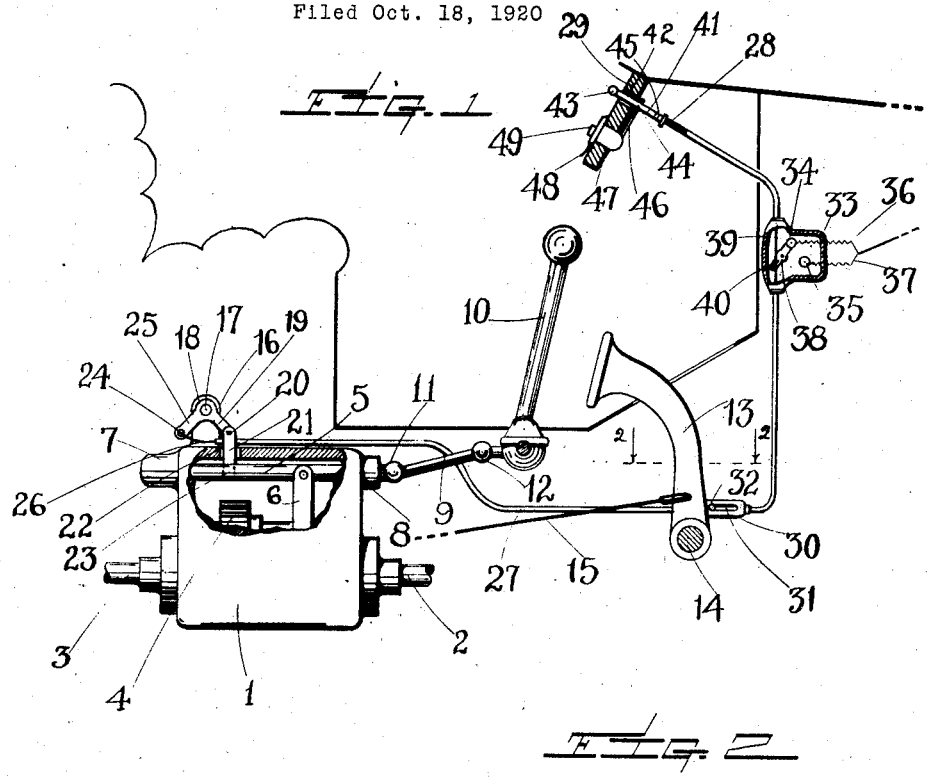

In the accompanying drawing, wherein I have illustrated a preferred form of embodiment of my invention:

Figure 1 is an elevational view showing an operation of the mechanism usually employed in a motor vehicle, such as a motor car, truck, or the like.

Figures 2, 3:
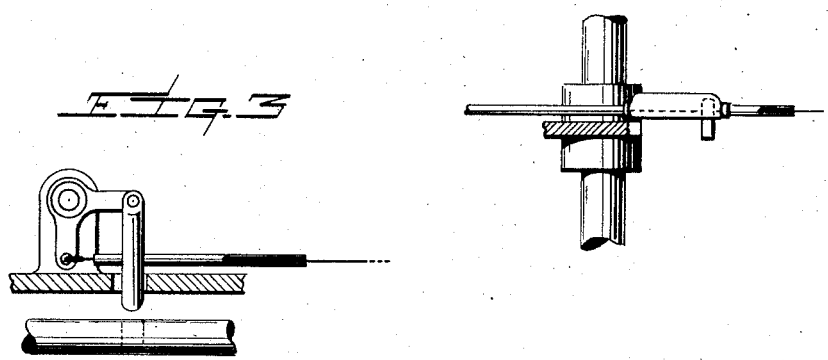

Figure 2 is a sectional view taken on line 2—2 of Figure 1, looking in the direction of the arrows; and Figure 3 is a sectional view, upon an enlarged scale, of that portion of the locking mechanism adapted to operate upon the transmission, the parts being shown in positions different from the way they are shown in Figure 1.

Referring now to the drawing, wherein similar reference characters refer to similar parts throughout the several views thereof, the reference numeral 1 denotes the transmission box of a motor vehicle, which box contains the usual shifting shift gears, by means of which the various speeds are transmitted from the drive shaft 2, leading from the engine to the driven shaft 3 connected with the road wheels, one of said shift gears being indicated at 4. 5 indicates a reciprocating rod or shaft, which is connected as by means of a lever 6, with said shifting mechanism, said rod being mounted in the usual bearings 7 and 8 provided in the transmission box. The rod 5 is connected by means of the link 9 with the shift lever 10, ball and socket joints 11 and 12 being interposed in said connecting means, it being understood that a swinging movement of the lever 10 operates the rod 5, to operate selectively the transmission gears, as is usual in motor car constructions.

In the present instance the lever 10 is shown in the "reverse" positions, that is to say, it has been thrown forwardly by the operator of the vehicle, to so manipulate the rod 5, that the transmission gears are so disposed in the box that the drive shaft 2 will communicate such rotative movement to the driven shaft 3 that the road wheels of the vehicle will be driven in a reverse direction.

The reference numeral 13 denotes the clutch lever, the latter being pivoted to the shaft 14, it being understood that said lever is connected as by the means 15 to the usual clutch.

All the parts so far described are those usually employed as a part of the transmission mechanism of a motor vehicle.

Referring now to my improved locking mechanism, the reference numeral 16 denotes a bracket erected upon the transmission box 1, to which is pivoted at 17 a bellcrank lever 18, one leg 19 of which has pivotally mounted thereon at 20 the bolt 21, said bolt 21 extending through an aperture 22 provided in the upper wall of the transmission box.

The rod or shaft 5, which operates the transmission, is provided with an aperture 23, which is adapted to be entered by the bolt

21 when the shift lever 10 has been moved to a reverse position, that is to say, when said shift lever 10 has been moved to reverse position, the operating rod 5 is moved to such position that the aperture 23 thereof registers with the bolt 21, so that when the bolt 21 is operated by the bell-crank lever 18, by means presently to be described, said bolt entering the recess 23 of said operating rod 5, will hold the latter in the position in which it has been moved by the shift lever. Thus it will be seen that the transmission is locked against any operation other than that which will propel the vehicle in a reverse direction.

Connected at 24 with the leg 25 of the bell-crank lever 18 is a wire 26. Wire 26 is located in a tube 27, which tube leads forwardly and upwardly, terminating at a point 28 at a position adjacent the dash 29 of the vehicle. This tube acts as a guide for the wire 26, which is constructed of relatively stiff material, but is possessed of such flexibility as will permit it to be reciprocated within the tube 27, the latter preventing any buckling of the wire. The curves or bends provided in the tube 27 from one end to the other, that is to say, from its end adjacent the bell-crank lever 18 to its position near the dash, are such that the wire can be freely slid backwardly and forwardly within the tube 27 when operated to manipulate the locking mechanism, one part of which has already been described.

Thus it will be seen that when the wire 26 is pushed rearwardly, by means presently to be described, it will swing the bell-crank lever 18 to cause the bolt 21 to enter the aperture 23 of the operating rod 5; assuming that the latter has been reciprocated to the position shown in the drawing, with the shift lever in the reverse position. The wire 26 passes through a small box or guide 30, located adjacent the clutch lever 13, said box having a slot 31, which receives a pin 32 attached to the wire 26. This pin, when the wire 26 is in the position shown in the drawing, is moved into the path which would ordinarily be travelled by the clutch lever 13 when the same is operated to release the clutch.

Thus it will be seen that when the parts are in the position shown in the Figure 1 of the drawing, the clutch lever cannot be operated to release the clutch, and it is, therefore, impossible to start the motor, inasmuch as it is directly connected through the clutch and transmission with the road wheels of the vehicle. The wire cannot be moved forwardly by reason of the fact that the bolt 21 is in locking position with the rod 5.

The reference numeral 33 denotes a box, preferably located within the hood of the vehicle, and within this box are provided contact points 34 and 35. These contact points are connected by means of leads 36 and 37, with the ignition system of the motor; that is to say, when the contact points 34 and 35 are not electrically connected, a complete break is established in said ignition system so that no current will be transmitted to the spark plugs of the motor.

The contact point 35 is carried upon the lever 38, pivoted as at 39 within the box 33, the opposite end of said lever being connected at 40 with the wire 26, which extends through said box, as shown, the tube 27 being so connected with the box that the wire is free within the latter. The upper end of the wire 26 is connected with an operating handle or rod 41, the latter extending through an aperture 42 provided in the dash, and the outer end of said rod 41 is provided with an operating handle or knob 43.

The rod 41 is provided with a plurality of apertures 44 and 45 respectively, which are adapted to receive a bolt 46, the latter being so connected with the locking mechanism, indicated generally at 47, that when the latter is operated, the bolt 46 may be projected through either of the apertures 44 or 45, depending upon the position of the rod 41. In the present instance it will be noted that the rod 46 extends through the aperture 44, holding the wire in the position shown in the drawing, whereby both of the locking devices are in position to lock the mechanism and to hold the contact members 34 and 35 out of engagement, whereby the ignition system is rendered inoperative.

When the locking mechanism 47 is manipulated to move the bolt 46 from the aperture 44, the rod 41 may be pulled outwardly, whereby the bolt 46 may be projected through the aperture 45, whereby the wire will be held in its opposite position, the two locking devices for the transmission and clutch respectively, being moved to inoperative positions, and the ignition system being restored to operative condition by the engagement of the contact points 34 and 35.

The locking mechanism 47 is preferably a combination lock, such as usually employed upon safes, the latter being operated by means of the dial 48, so that a handle 49 when released by a manipulation of said dial, may be rotated to reciprocate the bolt 46, as above described.

Having thus described this embodiment of my invention, the operation thereof, which should be largely understood, is as follows:

With the parts in the position shown in the drawings, it will be noted that the transmission and clutch mechanism are in locked conditions, and the ignition system is disconnected. Moreover, it will be noted that both ends of the wire 26 are securely locked, whereby the wire cannot be reciprocated within the tube 27, it being understood that the latter will be preferably placed in a position inaccessible to any unauthorized person attempting to manipulate the locking mechanism so as to release the latter from its locked condition.

When the operating rod 41, however, is moved in such position as to permit the bolt 46 to engage the aperture 45, the upward sliding movement of the wire will release both of the locking devices and restore the ignition system to operative condition.

It will accordingly be seen that I have provided a construction well adapted to attain, among others, all the aims and objects above pointed out, in an extremely simple yet efficient manner, whereby the transmission and ignition of a motor car may be effectively and securely locked, or rendered inoperative at a plurality of positions.

Having thus described my invention what I claim as new and desire to secure by Letters Patent is:

1. In a motor vehicle, the combination with a transmission and clutch mechanism and ignition system, locking means for the transmission and clutch mechanism, circuit breaking means for said ignition system, and a flexible member connected with each of the aforesaid instrumentalities and operable from a position adjacent the dash of the car, adapted to operate them so that said transmission and clutch mechanism are locked, and said ignition system rendered inoperative.

2. In a motor vehicle, the combination with a transmission and clutch mechanism and ignition system, locking means for the transmission and clutch mechanism, circuit breaking means for said ignition system, and a flexible member connected with each of the aforesaid instrumentalities and operable from a position adjacent the dash of the car, adapted to operate them so that said transmission and clutch mechanism are locked, said ignition system rendered inoperative, and means for guiding said flexible member.

3. In a motor vehicle, the combination with a transmission and clutch mechanism and ignition system, locking means for the transmission and clutch mechanism, circuit breaking means for said ignition system, and a flexible member connected with each of the aforesaid instrumentalities and operable from a position adjacent the dash of the car, adapted to operate them so that said transmission and clutch mechanism are locked, said ignition system rendered inoperative, and a tubular member through which said flexible member extends.

4. In a vehicle, the combination with transmission and clutch mechanisms, of locking means for each of said mechanisms, a flexible member connected with said locking means, and means for locking said flexible member in a plurality of positions.

5. A motor vehicle, in combination with the transmission and clutch mechanism, of locking means for each of said mechanisms, an endwise movable flexible member connected with each of said locking means, said flexible member being operable from a position adjacent the dash of the car, and means for locking said flexible member in a plurality of positions, whereby it may be held in such positions that the locking means are effective or ineffective.

6. A motor vehicle, in combination with the transmission and clutch mechanism, of locking means for each of said mechanisms, an endwise movable flexible member connected with each of said locking means, said flexible member being operable from a position adjacent the dash of the car, means for locking said flexible member in a plurality of positions, whereby it may be held in such positions that the locking means are effective or ineffective, and a tubular member through which said flexible member extends.

7. In a motor vehicle, the combination with transmission and clutch mechanisms, of locking means for each of said mechanisms, including a flexible member endwise movable, and means for locking said flexible member in a plurality of positions.

8. In a motor vehicle, the combination with transmission and clutch mechanisms, locking means for each of said mechanisms, an ignition system, circuit breaking means for said ignition system, and a flexible member endwise movable to operate said locking and circuit breaking means.

9. In a motor vehicle, the combination with transmission and clutch mechanisms, locking means for each of said mechanisms, an ignition system, circuit breaking means for said ignition system, a flexible member endwise movable to operate said locking and circuit breaking means, and a lock to hold said flexible member in a plurality of positions.

In testimony whereof, I affix my signature in the presence of two witnesses.

KARL WEKERLE.

Witnesses:
 EMMA WEINBERG,
 IRVING A. HAMER.